(12) United States Patent
Wang

(10) Patent No.: US 7,635,044 B1
(45) Date of Patent: Dec. 22, 2009

(54) SAFETY DEVICE FOR A MOTORCYCLE GEAR LEVER

(76) Inventor: Chun-Chieh Wang, No. 41, Lane 121, Sec.3, Jhongshan Rd., Changhua Hsien (TW)

( * ) Notice: Subject to any disclaimer, the term of this patent is extended or adjusted under 35 U.S.C. 154(b) by 0 days.

(21) Appl. No.: 12/240,846

(22) Filed: Sep. 29, 2008

(51) Int. Cl.
 *B60R 25/00* (2006.01)
(52) U.S. Cl. ...................................... 180/287
(58) Field of Classification Search ........... 180/287; 74/473.16, 512, 513
 See application file for complete search history.

(56) References Cited

U.S. PATENT DOCUMENTS 4,693,488 A * 9/1987 Bernocco .................... 280/293
7,467,530 B2 * 12/2008 Torrado et al. ................. 70/33
2005/0103584 A1 * 5/2005 Hogesta ....................... 188/265

\* cited by examiner

*Primary Examiner*—Faye M. Fleming
(74) *Attorney, Agent, or Firm*—WPAT, P.C.; Anthony King

(57) ABSTRACT

A safety device for a motorcycle gear lever includes a gear lever and a mounting member. The gear lever has a base member, a pivoting member mounted pivotally on the base member and a foot post. The foot post is mounted on the pivoting member and has an annular groove. The mounting member is disposed adjacent to the gear lever and has a mounting hole and a key lock having a locking member. When the pivoting member pivots, the foot post is mounted in the mounting hole and the locking member of the lock selectively engages the annular groove of the foot post to lock the foot post.

8 Claims, 4 Drawing Sheets

SAFETY DEVICE FOR A MOTORCYCLE GEAR LEVER

BACKGROUND OF THE INVENTION

1. Field of Invention

The present invention relates to a motorcycle part, and more particularly to a safety device for a motorcycle gear lever and that can lock the motorcycle on the gear lever against burglary and is easy to use.

2. Description of the Related Art

Motorcycles are common for transportation due to their convenient and lightweight properties, but motorcycles have a serious burglary problem. Motorcycle owners often use several locks on their motorcycles to prevent their motorcycles from being stolen. However, the locks cause additional expenses and troubles for carrying. Thus, developing a safety device for a motorcycle that is easy to use is an important topic for the motorcycle and lock industries.

To overcome the shortcomings, the present invention provides a safety device for a motorcycle gear lever to mitigate or obviate the aforementioned problems.

SUMMARY OF THE INVENTION

The primary objective of the present invention is to provide a safety device for a motorcycle gear lever that can lock the motorcycle on the gear lever against burglary and is easy to use.

A safety device for a motorcycle gear lever in accordance with the present invention comprises a gear lever and a mounting member. The gear lever has a base member, a pivoting member mounted pivotally on the base member and a foot post. The foot post is mounted on the pivoting member and has an annular groove. The mounting member is disposed beside the gear lever and has a mounting hole and a key lock having a locking member. When the pivoting member pivots, the foot post is mounted in the mounting hole and the locking member of the key lock selectively engages the annular groove of the foot post to lock the foot post. Thus, because the safety device is combined with the gear lever of the motorcycle, the safety device is equipped on the motorcycle directly and is easy to carry and use.

Other objectives, advantages and novel features of the invention will become more apparent from the following detailed description when taken in conjunction with the accompanying drawings.

DETAILED DESCRIPTION OF THE INVENTION

Figure 1:
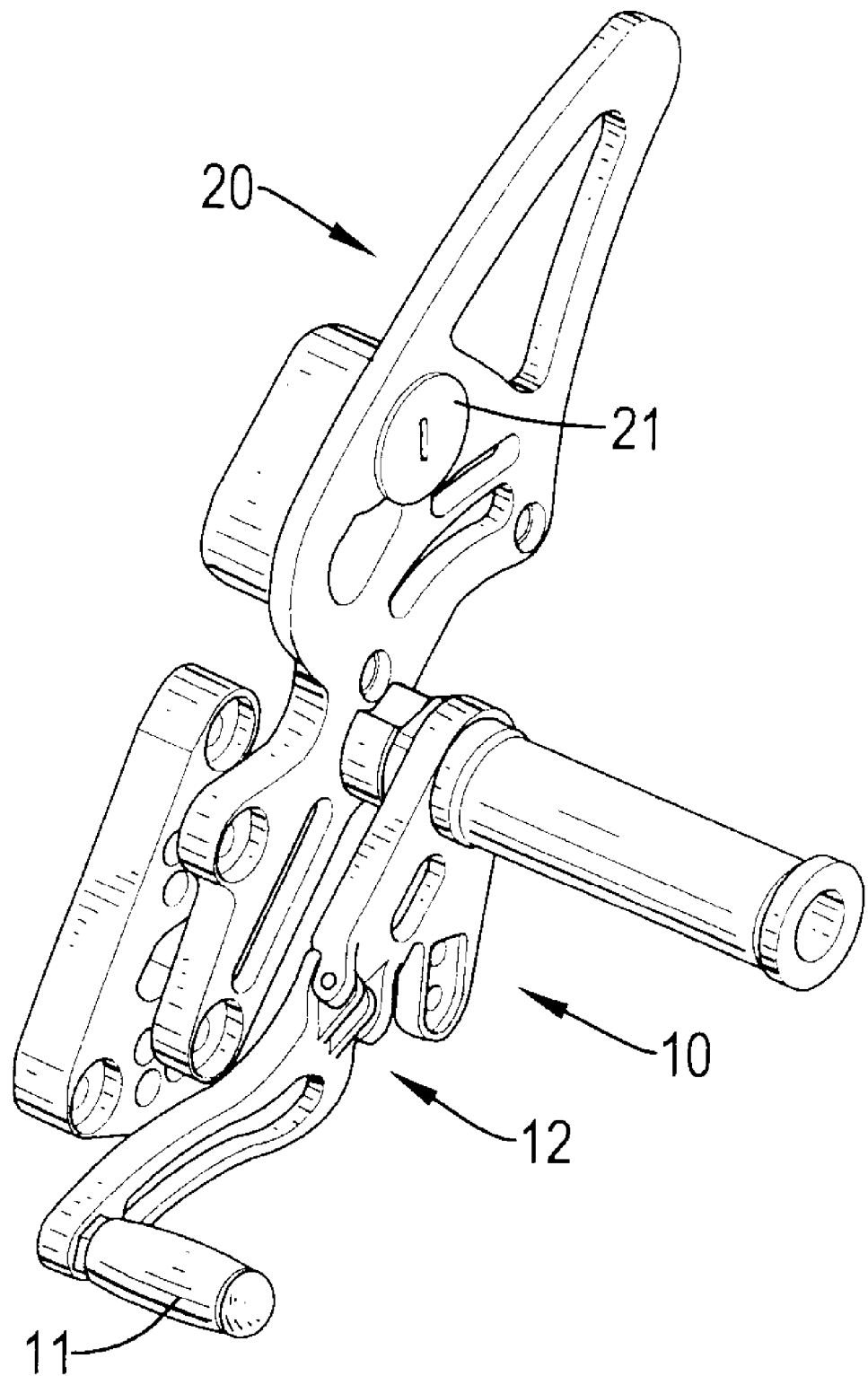
FIG. 1 is a perspective view of a safety device for a motorcycle gear lever in accordance with the present invention.
Figure 2:
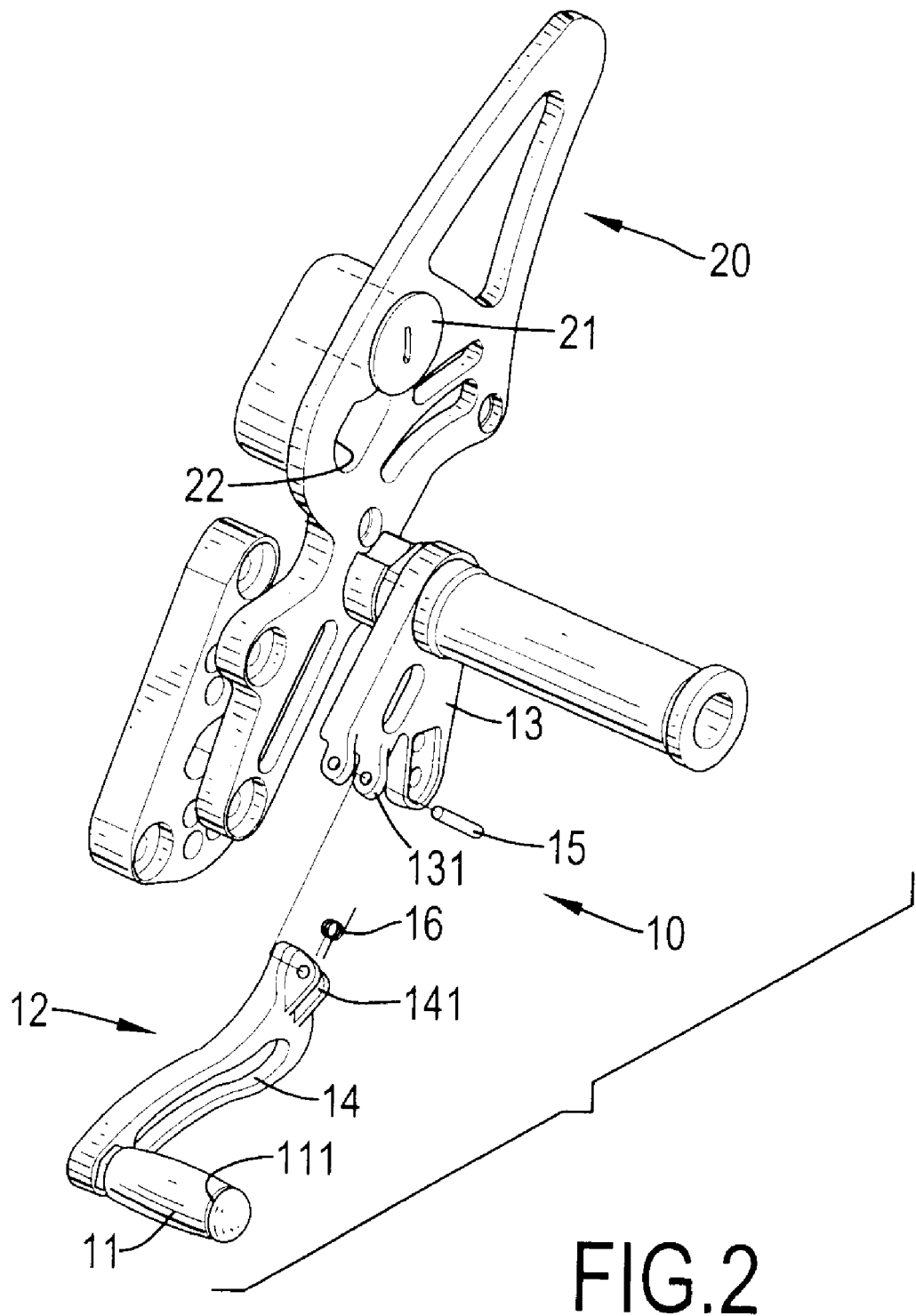
FIG. 2 is a partially exploded perspective view of the safety device for a motorcycle gear lever in FIG. 1.
Figure 3:
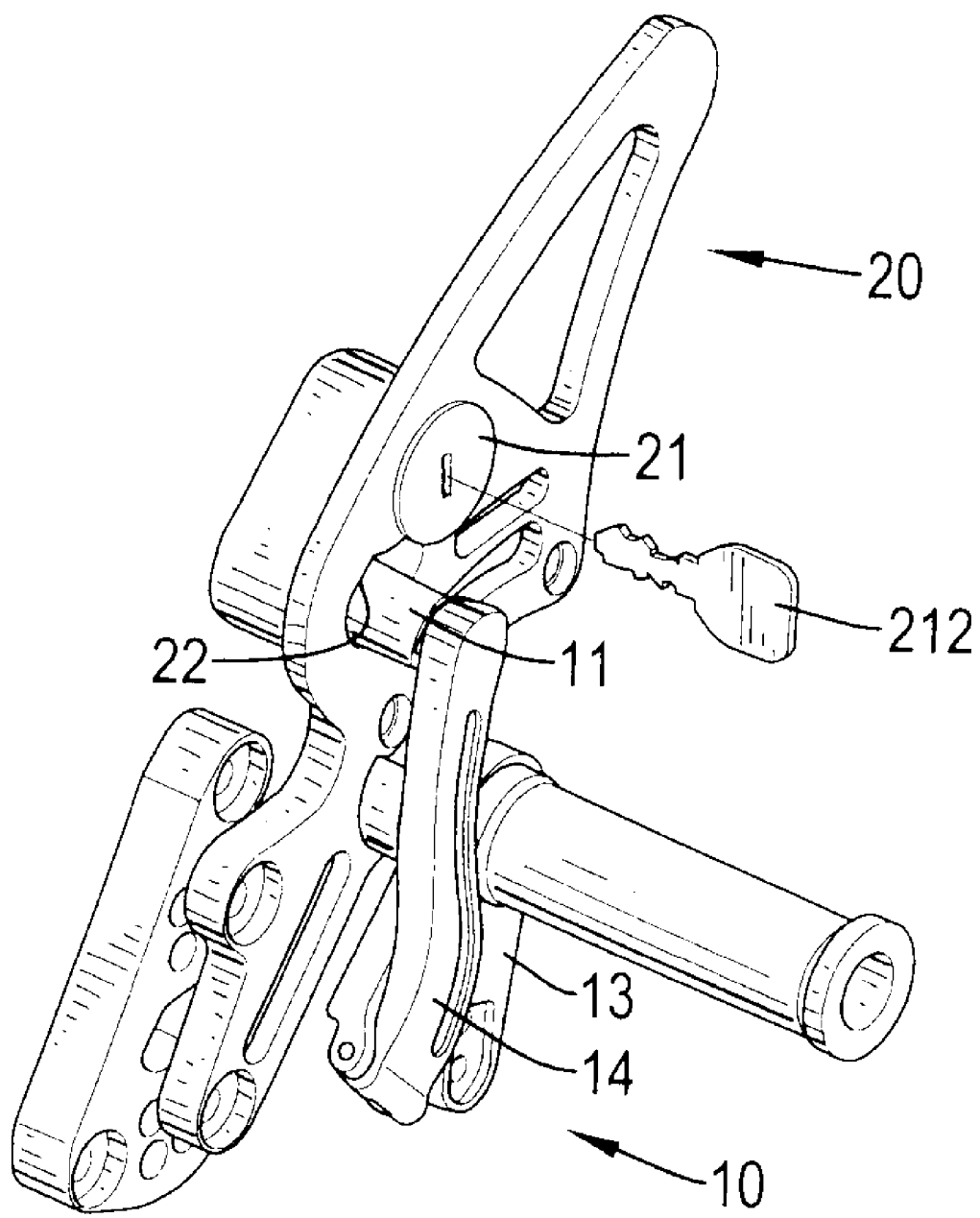
FIG. 3 is an operational perspective view of the safety device for a motorcycle gear lever in FIG. 1.

With reference to FIGS. 1 to 3, a safety device for a motorcycle gear lever in accordance with the present invention comprises a gear lever (10) and a mounting member (20).

The gear lever (10) has a distal end, a foot post (11) and a pivoting mechanism (12) and may further comprise a base member (13), a pivoting member (14), a pivot (15) and a returning spring (16). The foot post (11) is mounted on the distal end of the gear lever (10) for a user operating the gear lever with a foot and may have an annular groove (111). The pivoting mechanism (12) is connected to the distal end of the gear lever (10) so as to allow the distal end of the gear lever (10) with the foot post (11) to pivot relative to the other parts of the gear lever (10).

The base member (13) has a distal end, a proximal end and two connecting lugs (131). The proximal end of the base member (13) can be connected with a footrest of a motorcycle and may be connected to a gear box of the motorcycle. The connecting lugs (131) are formed on the distal end of the base member (13) in parallel and each connecting lug (131) has a connecting hole corresponding to each other.

The pivoting member (14) is mounted pivotally on the base member (13) and has a proximal end, a distal end and two pivoting lugs (141). The proximal end of the pivoting member (14) is mounted pivotally on the distal end of the base member (13). The distal end is connected to the foot post (11). The pivoting lugs (141) are formed on the proximal end of the pivoting member (14) in parallel and are mounted between the connecting lugs (131) of the base member (13). Each pivoting lug (141) has a pivoting hole corresponding to each other and aligned with the connecting hole of one of the connecting lugs (131).

The pivot (15) is mounted in the connecting holes and the pivoting holes so the pivoting member (14) is mounted pivotally on the base member (13).

The returning spring (16) is mounted between the base member (13) and the pivoting member (14). When the pivoting member (14) is pivoted, the returning spring (16) provides the pivoting member (14) with a returning force for forcing the pivoting member (14) back to its original position.

Figure 4A:
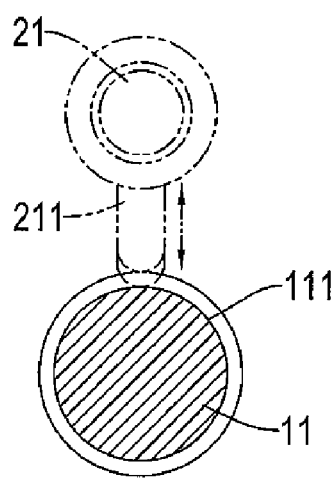
FIG. 4A is an operational side view of the safety device for a motorcycle gear lever in FIG. 3.
Figure 4B:
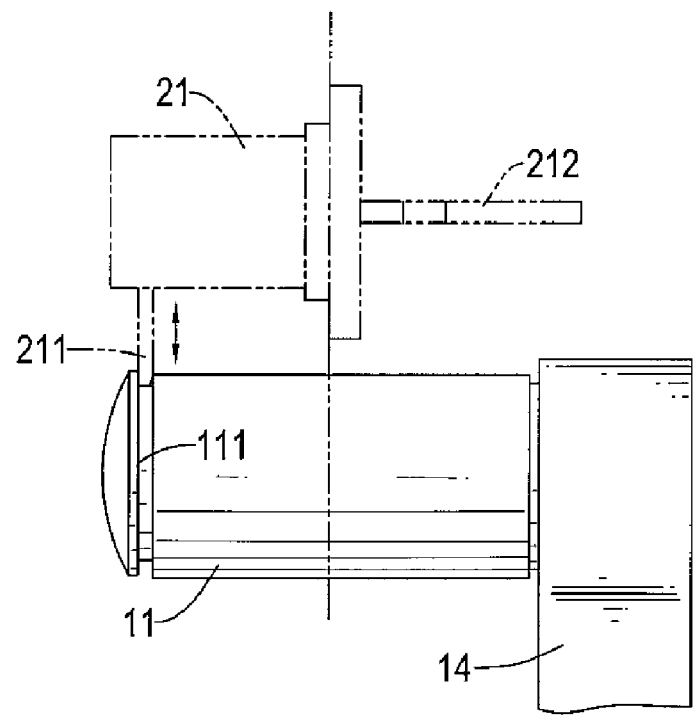
FIG. 4B is an operational front view of the safety device for a motorcycle gear lever in FIG. 3.

With further reference to FIGS. 4A and 4B, the mounting member (20) is disposed adjacent to the gear lever (10) and has a mounting hole (22) and a lock (21). The mounting hole (22) corresponds to the foot post (11) when the distal end of the gear lever (10) is pivoted. The lock (21) is disposed adjacent to the mounting hole (22) and may be a key lock, combination lock or any possible lock. When the lock (21) is a key lock, the lock (21) has a keyhole and a locking member (211). The keyhole corresponds to a key (212). The locking member (211) is driven by the key (212), extends selectively into the mounting hole (22) to engage the annular groove (111) of the foot post (11) and may be retractable.

When the distal end of the gear lever (10) is pivoted relative to the base member (13) to make the foot post (11) being inserted into the mounting hole (22) of the mounting member (20), the foot post (11) is at a location adjacent to the lock (21) of the mounting member (20). Then the key (212) is inserted into the keyhole of the lock (21) and is twisted to drive the locking member (211) to extend into the mounting hole (22) and engage the annular groove (111) of the foot post (11) to lock the foot post (11). When the locking member (211) is retractable, the locking member (211) is forced to retract by the foot post (11) and then moves outwards to engage the annular groove (111) of the foot post (11). Thus, the locking of the foot post (11) needs not the key (212).

Thus, because the gear lever (10) cannot be operated to shift gears, the motorcycle cannot be ridden so as to acquire a safety effect. When the motorcycle is unlocked to be ridden, the key (212) must be inserted into the keyhole of the lock (21) to drive the locking member (211) of the lock (21) disengaging from the annular groove (111). Then the pivoting member (14) is pivoted to its original position through the returning force provided by the returning spring (16). Therefore, the foot post (11) can be lifted or pushed to change gears and the riding of the motorcycle can be performed.

Because the safety device is combined with the gear lever (10) of the motorcycle, the safety device is equipped on the motorcycle directly and is easy to use. Multiple locking effects can be performed on the motorcycle easily and conveniently without carrying additional locks. Additionally, because the safety device is equipped on the motorcycle directly, the user of the motorcycle is less likely to forget locking the motorcycle and the motorcycle is not easy to be stolen.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A safety device for a motorcycle gear lever comprising
a gear lever having
a base member having
a proximal end; and
a distal end;
a pivoting member being mounted pivotally on the base member and having
a proximal end being mounted pivotally on the distal end of the base member; and
a distal end; and
a foot post being mounted on the distal end of the pivoting member and having an annular groove; and
a mounting member being disposed adjacent to the gear lever and having
a mounting hole corresponding to the foot post when the pivoting member of the gear lever being pivoted; and
a key lock being disposed adjacent to the mounting hole and having
a keyhole corresponding to a key; and
a locking member being driven by the key to selectively engage the annular groove in the foot post when the pivoting member of the gear lever being pivoted.

2. The safety device for a motorcycle gear lever as claimed in claim 1, wherein
the base member has two connecting lugs formed on the distal end of the base member in parallel and each connecting lug has a connecting hole corresponding to each other;
the pivoting member has two pivoting lugs formed on the proximal end of the pivoting member in parallel, is mounted between the connecting lugs of the base member and each pivoting lug has a pivoting hole corresponding to each other and aligned with the connecting hole of one of the connecting lugs; and
the gear lever further comprises a pivot mounted in the connecting holes and the pivoting holes.

3. The safety device for a motorcycle gear lever as claimed in claim 2, wherein the gear lever further has a returning spring mounted between the base member and the pivoting member.

4. The safety device for a motorcycle gear lever as claimed in claim 3, wherein the locking member is retractable.

5. The safety device for a motorcycle gear lever as claimed in claim 1, wherein the gear lever further has a returning spring mounted between the base member and the pivoting member.

6. The safety device for a motorcycle gear lever as claimed in claim 5, wherein the locking member is retractable.

7. The safety device for a motorcycle gear lever as claimed in claim 1, wherein the locking member is retractable.

8. The safety device for a motorcycle gear lever as claimed in claim 2, wherein the locking member is retractable.

* * * * *